United States Patent
Shrestha et al.

(10) Patent No.: US 10,936,254 B2
(45) Date of Patent: *Mar. 2, 2021

(54) PRINTER FOR SNAPPING AN IMAGE AND NOTIFYING A USER TO PICK-UP A PRINTED DOCUMENT

(71) Applicant: KYOCERA Document Solutions, Inc., Osaka (JP)

(72) Inventors: Shaileesha Shrestha, Garden Grove, CA (US); Tomohiro Kuwahara, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,971

(22) Filed: Nov. 19, 2019

(65) Prior Publication Data

US 2020/0241812 A1 Jul. 30, 2020

Related U.S. Application Data

(63) Continuation of application No. 16/262,498, filed on Jan. 30, 2019, now Pat. No. 10,528,298.

(51) Int. Cl.
*G06F 3/12* (2006.01)
(52) U.S. Cl.
CPC .......... *G06F 3/1207* (2013.01); *G06F 3/1273* (2013.01); *G06F 3/1292* (2013.01)
(58) Field of Classification Search
None
See application file for complete search history.

(56) References Cited

U.S. PATENT DOCUMENTS

| | | | |
|---|---|---|---|
| 8,218,994 B2* | 7/2012 | Sato | H04N 1/00689 399/80 |
| 10,528,298 B1* | 1/2020 | Shrestha | G06F 3/1238 |
| 2002/0145752 A1* | 10/2002 | Hanabusa | H04N 1/00164 358/1.15 |
| 2005/0105920 A1* | 5/2005 | Matsunaga | H04N 1/00127 399/1 |
| 2007/0206212 A1* | 9/2007 | Ohno | G06F 3/1248 358/1.14 |
| 2008/0170256 A1* | 7/2008 | Matsuhara | G06F 3/1288 358/1.15 |
| 2008/0243818 A1* | 10/2008 | Ming | H04N 1/34 |

(Continued)

*Primary Examiner* — Thomas D Lee
(74) *Attorney, Agent, or Firm* — W. Eric Webostad

(57) ABSTRACT

Method(s) and apparatus(es) relate to notification to pick-up a printed document ("document"). In a method, stored are: at least one print image of the document; print metadata; and a user identity. A snap-notify function for a photograph of at least one printed page of the document is to store at least one photo image and associated photo metadata. The photo metadata is compared with data entries in a printer log to obtain a match to the print metadata. The at least one photo image stored relating to the photo metadata matching the print metadata is retrieved. The at least one photo image is compared to the at least one print image. Responsive to determining the at least one photo image matches the at least one print image to at least a threshold percentage, sent from the printer is a confidential notification for the user identity to pick up the document.

20 Claims, 9 Drawing Sheets

(56) References Cited

U.S. PATENT DOCUMENTS

| | | | |
|---|---|---|---|
| 2010/0188684 A1* | 7/2010 | Kumara | G06F 21/608 358/1.14 |
| 2011/0255132 A1* | 10/2011 | Shimada | H04N 1/00244 358/1.15 |
| 2013/0155443 A1* | 6/2013 | Wu | H04N 1/00838 358/1.14 |
| 2018/0220023 A1* | 8/2018 | Wang | H04N 1/00488 |

* cited by examiner

PRINTER FOR SNAPPING AN IMAGE AND NOTIFYING A USER TO PICK-UP A PRINTED DOCUMENT

CROSS-REFERENCE TO RELATED APPLICATIONS

This application is a continuation of U.S. application Ser. No. 16/262,498, filed Jan. 30, 2019, the entirety of the disclosure of which is incorporated by reference herein for all purposes. This application is related to co-pending U.S. patent application Ser. No. 16/262,393 and Ser. No. 16/262,571, the entirety of the disclosures of each of which are incorporated by reference herein for all purposes.

TECHNICAL FIELD

The following description relates to a printed document. More particularly, the following description relates to notifying a user to pick-up a printed document.

BACKGROUND

Many offices may have a central printer for all or set of employees to use. For a printer, including without limitation a multifunction printer, a number of printed documents or other paper-based documents may be left at such printer. People may print documents and forget to pick them up. Such printed documents may stay in a printer area for one or more days and then may be thrown away or picked by other employees along with their printed documents. This may lead to reprinting of documents leading to wasting paper and energy, in addition to clutter in a printer area.

For security reasons, indicating who printed a document may not be posted with such printed document. Therefore, determining who printed a document may be problematic.

SUMMARY

A method relates generally to notification to pick-up a printed document. In such a method, identity data is registered in memory of a printer for registered users thereof. For a printing operation of the printer associated with the printed document, the following are stored in the memory of the printer: at least one print image of the printed document; print metadata associated with the printing operation in a printer log; and a user identity associated with the printing operation. A snap-notify function of an application is executed to cause a camera to be activated. A photograph of at least one printed page of the printed document via the camera is received to store therefor at least one photo image and associated photo metadata. The photo metadata is compared with data entries in the printer log to obtain a match to the print metadata. The at least one photo image stored in relation to the photo metadata matching the print metadata is retrieved. The at least one photo image is compared to the at least one print image. Responsive to determining the at least one photo image matches the at least one print image to at least a threshold percentage, sent from the printer is a confidential notification for the user identity to pick up the printed document.

A printer relates generally to notification to pick-up a printed document, In such a printer, memory of the printer is configured to register identity data for registered users thereof. The printer is configured to store in the memory for a print operation associated with the printed document: at least one print image of the printed document; print metadata associated with the print operation in a printer log; and a user identity associated with the print operation. A snap-notify function of an application is to cause a camera to be activated to ready the camera for a photograph of at least one printed page of the printed document to store therefor at least one photo image and associated photo metadata. The printer responsive to the application is configured to: compare the photo metadata with data entries in the printer log to obtain a match to the print metadata; retrieve the at least one photo image stored for a match between the photo metadata and the print metadata; compare the at least one photo image to the at least one print image; and send a confidential notification to the user identity to pick up the printed document responsive to a determination the at least one photo image matches the at least one print image to at least a threshold percentage.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a flow diagram depicting an example of a backend portion of a notification flow to pick-up a printed document.

FIG. 2-2 is a flow diagram depicting an example of comparing and matching operations of FIG. 2-1.

FIG. 2-3 is a flow diagram depicting an example of purge operations for another example of a notification flow.

FIG. 2-4 is a flow diagram depicting an example of another notification flow to pick-up a printed document.

FIG. 3 is a block diagram depicting an example of a registered users record or table.

FIG. 4 is a block diagram depicting an example of a printer log.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Figure 1:
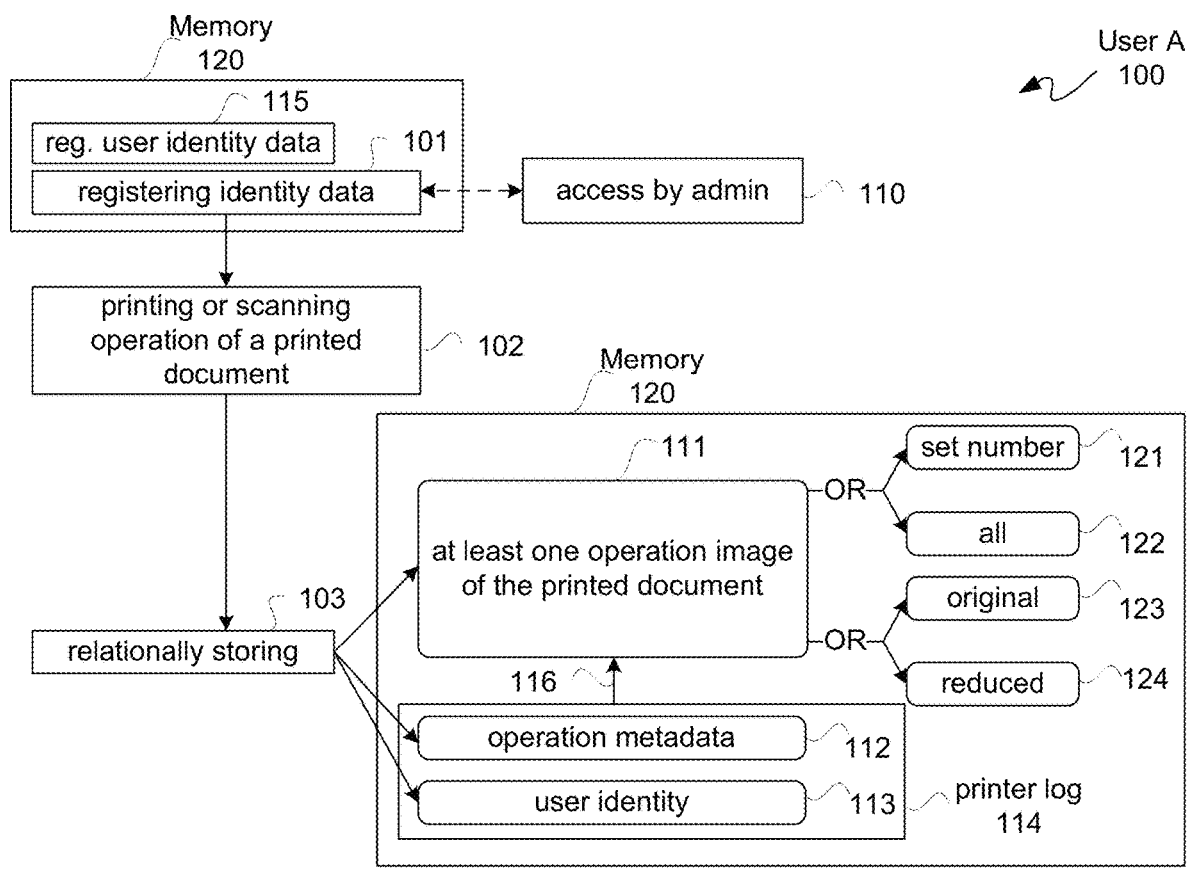
FIG. 1 is a flow diagram depicting an example of a frontend portion of a notification flow to pick-up a printed document.

FIG. 1 is a flow diagram depicting an example of a frontend portion 100 of a notification flow to pick-up a printed document. Frontend portion 100 is for a preliminary portion of a notification flow, such as associated with acts by a first user ("User A").

At operation 101, users identity data ("identity data") 115 is registered or otherwise stored for purposes of retrieval. Such identity data 115 may be registered in memory 120 of a multifunction peripheral ("MFP"), such as for example a multifunction printer, or in a cloud computing system or intranet. Such identity data 115 may be for registered users of such an MFP. For purposes of clarity by way of example and not limitation, it shall be assumed identity data 115 is stored in memory 120 of an MFP.

For security reasons, any user may optionally have limited access to such identity data for purposes of making any changes thereto. Such limited access may be limited to administrative accessing 110.

At operation 102, a printing or scanning operation of an MFP may be performed, such as by User A, on or for a printed document. At operation 103, information associated with such printed document and operation therefor may be stored, such as for example relationally stored in memory 120 of such an MFP. Such information stored at operation 103 may include at least one operation image 111, such as an image of a direct print or scan of such a printed document, and may include operation metadata 112 associated with such operation conducted at operation 102 as described below in additional detail.

For storing at least one operation image 111 of such a printed document as part of operation 103, a set number of pages 121 may be set as a maximum number of pages of images for such an MFP to store for a printed document. In another example, for storing at least one operation image of such a printed document, all pages 122, namely no maximum number of pages of images, for such an MFP to store for a printed document may be set.

For storing at least one operation image 111 of such a printed document, an original resolution 123 may be set for such at least one operation image for an MFP to store for a printed document. In another example, for storing at least one operation image 111 of such a printed document, a reduced resolution 124, such as for reducing memory requirements and/or enhanced security, for such an MFP to store at least one operation image for a printed document may be set. In this example, at least a 75% reduced resolution from an original printed sheet is used; however, in another example, a different reduction of resolution may be used. For this example, for an original resolution of 600 dpi (dots per inch) horizontally and vertically in each printed square inch of sheet, a 75% reduction in resolution may be 150 dpi horizontally and vertically in each printed square inch scanned. Such a reduced resolution format may be preset.

Information stored at operation 103 may additionally include stored operation metadata 112, such as scan metadata or print metadata associated with a direct scanning or printing operation of such a printed document using such an MFP. Relational storage at operation 103 may use memory 120. In this example, a printer log 114, such as may be in memory 120, may be for operations conducted using an MFP. Along those lines, operation metadata 112, which may be for a direct print or scan of a printed document using an MFP at operation 102, may be stored in printer log 114. Furthermore, printer log 114 may include a pointer, generally indicated with arrow 116, to at least one operation image 111 in relational association with corresponding operation metadata 112.

Information stored at operation 103 may include user identity data ("user identity") 113 associated with a direct scanning or printing operation document, using an MFP. User identity 113 may be of a registered user in stored identity data 115 in memory 120. User identity 113 may be considered part of operation metadata 112, but is separated out in this example for purposes of clarity and not limitation.

User identity 113 may be stored in a secured manner. Furthermore, for security reasons, user identity 113 may not be present on a printed document.

For purposes of clarity by way of non-limiting example, after a scanning or printing operation 102 using an MFP, a User A may not have retrieved such a printed document. For example, a User A may have forgotten to take with them or pick up such printed document. Other examples may include: User A having thought such an MFP was a different MFP in a network with respect to printing a document; or location of an MFP may be unknown to User A with respect to printing a document.

A subsequent user ("User B") of such an MFP may find such printed document, and want to ping User A to retrieve such printed document, for any of a number of reasons. For example, User B may want to avoid having clutter at such an MFP, unsecured printed documents at such an MFP, and/or having User A expend additional resources to reprint such a printed document. Accordingly, a confidential notification to a registered user associated with user identity 113 may be useful, as described below in additional detail.

Registered users are not limited to employees of a company. Other types of registered users, including guests, may be included. For example, when guests check into hotels, their information is stored in a hotel's system. A guest may receive a key card to access property of hotel, and this key card may be used to access a printer for example. For example, suppose a Guest 'A' can scan their key card, or enter their information like name, phone number, and/or room number, to use a hotel printer. Such a printer may record a time stamp when such printer was used by Guest 'A'. A hotel system may have information of Guest 'A', such as for example name, phone number, and/or email used for checking in. Suppose Guest 'A' prints a document 'D' and forgets to pick such document 'D' up, and then Person 'B' arrives and finds document 'D'. Person 'B' may scan document 'D', and Guest 'A' may be identified for such document 'D' as described herein. In this example, a time stamp of when a document was printed or scanned may be captured, and so such a system may seek to find who logged into such a printer or an associated PC for communicating with such printer. After Guest 'A' is identified as associated with such document 'D', a text message or email may be sent to Guest 'A' with a message along the lines of for example: "You forgot your document by the printer, please pick up your document."

Figures 1, 2:
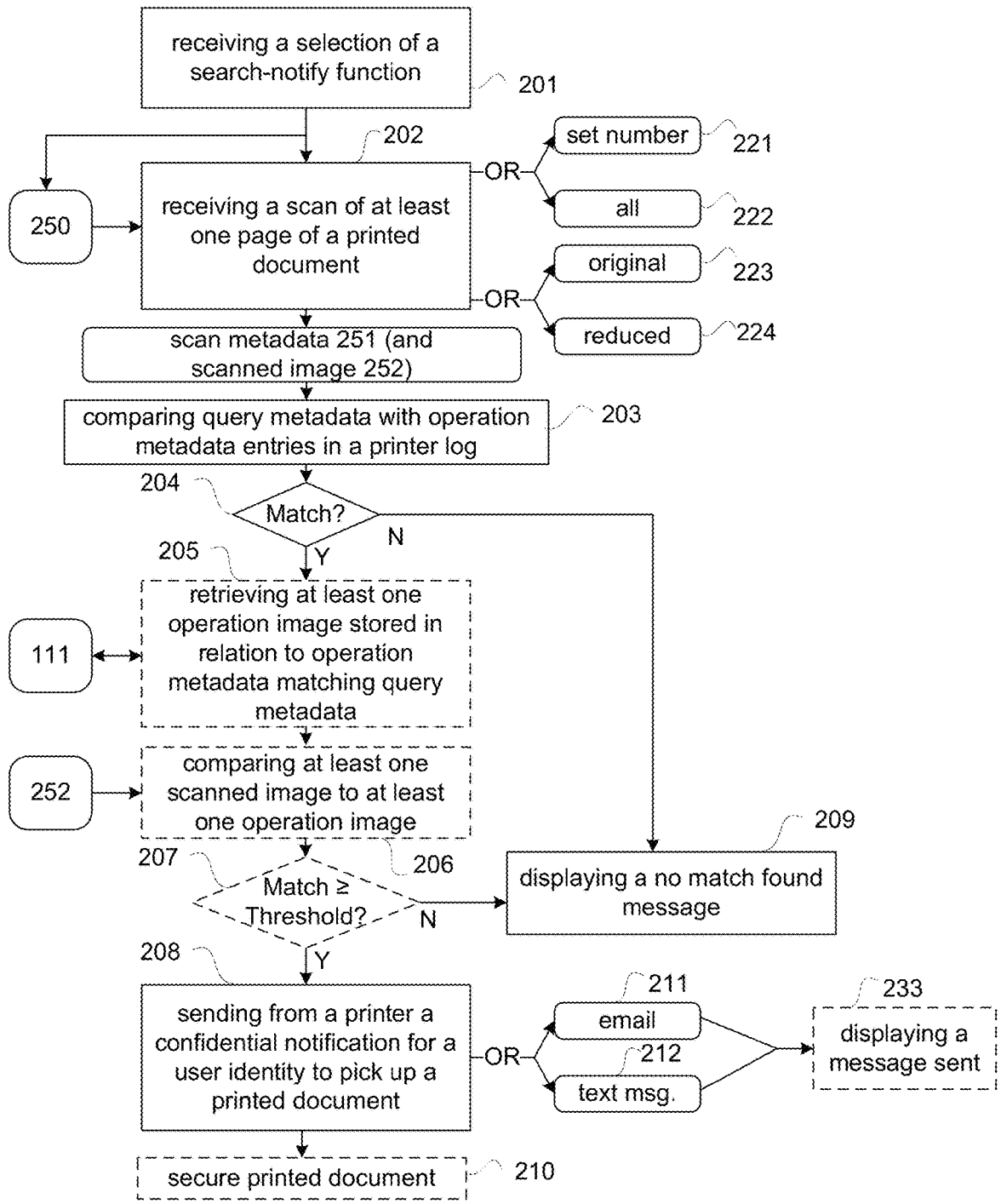
Figure 2:
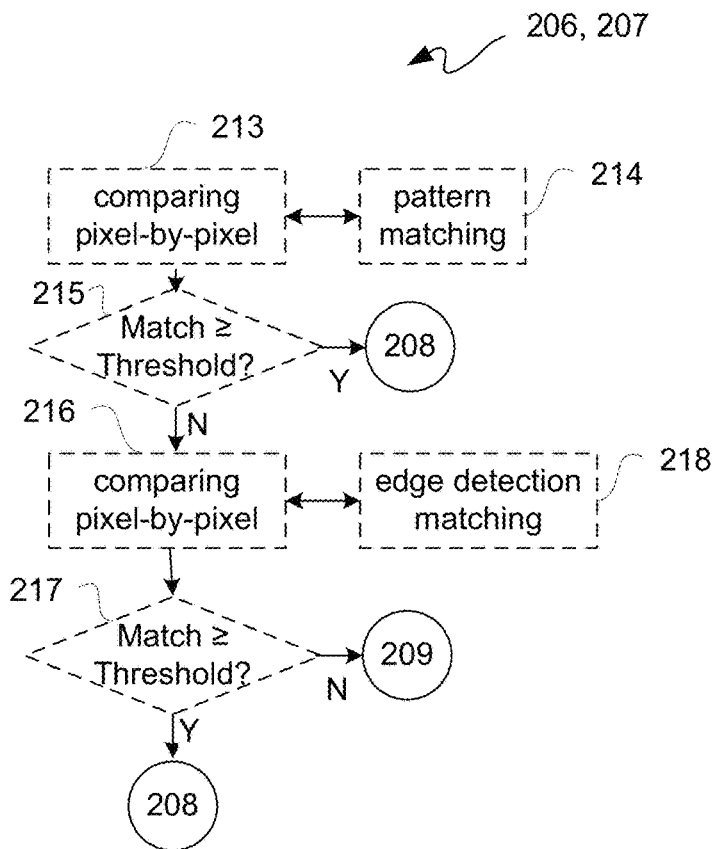

FIG. 2-1 is a flow diagram depicting an example of a backend portion 200 of a notification flow to pick-up a printed document. Backend portion 200 is described further with simultaneous reference to FIGS. 1 and 2-1.

Backend portion 200 is for a post-preliminary portion of a notification flow, such as associated with acts by a second user ("User B") of such an MFP. Accordingly, a combination of portions 100 and 200 may provide an overall notification flow.

At operation 201, User B may select a search-notify function of such an MFP. After such a selection, User B may scan such a printed document on such an MFP. At operation 202, a scan of at least one page 250 of such a printed document may be received by MFP to generate at least one scanned image 252 and scan metadata 251. In another example, such scan of at least one page 250 of such a printed document may be received or scanned by an MFP, and then at least one scanned image 252 and scan metadata 251 may be uploaded at operation 202 to a cloud-based computing system. Accordingly, more than one page of a printed document may be included in a scanned image 252.

For storing at least one scanned image 252 of such a printed document, a set number of pages 221 may be set as a maximum number of pages of images for such an MFP or cloud-based computing system to store for a printed document. Optionally, a User B may select a number of pages to be scanned for a document, which may be as few as a single page. For a cloud-based computing system, memory may be larger, and so a larger maximum number may be used. In another example, for storing at least one scanned image 252 of such a printed document, all pages 222, namely no maximum number of pages of images, for such an MFP or cloud-based computing system to store for a printed document may be set.

For storing at least one scanned image 252 of such a printed document, an original resolution 223 may be set for such at least one scanned image 252 for such an MFP to scan for a printed document for storage in such MFP or cloud-based computing system. In another example, for storing at least one scanned image 252 of such a printed document, a reduced resolution format ("reduced resolution") 224, such as for reducing memory requirements and/or enhanced security, for such an MFP or cloud-based computing system to store at least one scanned image 252 for a printed document may be set. Settings 121 through 124 may correspond to settings 221 through 224 for purposes of subsequent comparison.

In this example, at least a 75% reduced resolution from an original printed sheet is used; however, in another example, a different reduction of resolution may be used. Again, for this example, for an original resolution of 600 dpi (dots per inch) horizontally and vertically in every printed square inch of sheet, a 75% reduction in resolution may be 150 dpi horizontally and vertically in every printed square inch scanned. Such a reduced resolution 224 may be preset for a scanning operation responsive to selection of a search-notify function at operation 201.

At operation 203, search-notify scan ("query") metadata is compared with stored data, or more particularly stored operation metadata 112, entries in a printer log 114 to obtain corresponding, or more particularly matching, stored operation metadata 112. This comparison may be performed by a notify application of an MFP or by a backend application of a cloud-based computing system, as described below in additional detail.

In this example, at operation 204, it is determined whether there is a match between query metadata 251 and operation metadata 112 stored in printer log 114. If no match is found as determined at operation 204, at operation 209 a no match found message may be displayed, such as for example on a display of such an MFP. In this example, an exact match threshold is used. However, in another example a less than an exact match threshold may be used for comparing query metadata 251 and operation metadata 112.

For a match between query metadata 251 and operation metadata 112 at operation 205, user identity 113 corresponding to such matching operation metadata 112 may be obtained from printer log 114. However, such corresponding user identity 113 may not be directly obtained at this juncture for purposes of additional security and/or confirmation by use of an additional optional check using images.

For a match between query metadata 251 and operation metadata 112 at operation 205, such an at least one operation image 111 stored in relation to such operation metadata 112 matching query metadata 251 may be retrieved.

At operation 206, such at least one scanned image 252 associated with matching query metadata 251 may be compared to such at least one operation image 111 retrieved in relating to matching operation metadata 112. For this example, a comparison operation 206 may be performed by a notify application of an MFP or by a backend application of a cloud-based computing system.

In this example, a match at operation 204 may not be sufficient for confirming and/or securing identity of an owner of a document, and so a second optional check for a match, though not necessarily an exact match, at operation 207, using optional operations 205 and 206, may be used to bolster confidence in owner identity.

Responsive to determining at operation 207 such at least one scanned image 252 matches at least one operation image 111 retrieved at operation 205 to at least a threshold percentage, at operation 208 such an MFP or cloud-based computing system may send a confidential notification to a user identity 113 associated with matching operation metadata 112 to pick up such a printed document. If no match is found as determined at operation 207 to at least a threshold percentage, at operation 209 a no match found message may be displayed on a display of such an MFP. A threshold percentage in this example is 80%; however, in another example, a lower or higher threshold percentage may be used.

Such a confidential notification sent at 208 may be by email 211 and/or text message 212. This confidential notification may be sent from such an MFP or cloud-based system without revealing User A identity to User B. Again, user identity 113 may be found with a match at operation 204, and this user identity 113, such as for a User A, need not be displayed, such as for example on a display of an MFP. Optionally, at operation 208, such an MFP or cloud-based computing system in response to sending a confidential notification may display on a display screen thereof at operation 233 to indicate a message was sent to an owner of such printed document without revealing user identity 113 of such owner.

Optionally, at a location of an MFP, there may be a safe with an electronic pad ("electronic safe") for opening, closing, locking, and unlocking. Accordingly, at operation 210, User B may put such a printed document in such an electronic safe and lock it via such pad. Such an MFP or cloud-based computing system may be in communication with such an electronic safe for setting a code for unlocking such electronic safe. A confidential notification sent at 208 may include a code for opening such electronic safe.

FIG. 2-2 is a flow diagram depicting an example of operations 206 and 207 of FIG. 2-1 for an example of a backend portion 200. This example of backend portion 200 is described further with simultaneous reference to FIGS. 1 through 2-2.

At operation 213, a comparison of at least one scanned image to at least one operation image may be performed on a pixel-by-pixel basis. In this example, such first pixel-by-pixel basis may be with pattern matching at operation 214.

At 215, if a match was found by a comparison at operation 213 to at least a threshold percentage, then, for this example, notification flow 200 may resume at operation 208. If, however, no match was found by a comparison at operation 213, as determined at operation 215 to at least a threshold percentage, then, for this example, notification flow 200 may at operation 216 optionally perform another comparison of at least one scanned image 252 to at least one operation image 111 on a different pixel-by-pixel basis. In this example, such second pixel-by-pixel basis may be with image edge detection matching at operation 218.

At 217, if a match was found by a comparison at operation 216 to at least a threshold percentage as determined at 217, then in this example notification flow 200 may resume at operation 208. If, however, no match was found by a comparison at operation 216 to a threshold percentage as determined at operation 217, then in this example notification flow 200 may resume at operation 209.

Figures 2, 3:
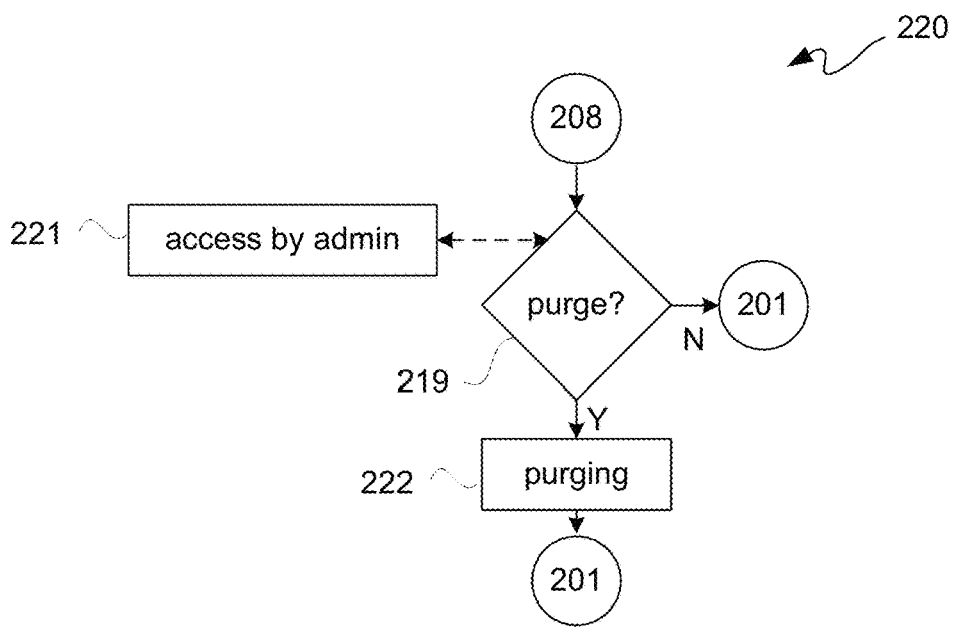

FIG. 2-3 is a flow diagram depicting an example of purge operations 220 for another example of a backend portion 200 of FIG. 2-1. This example of backend portion 200 is described further with simultaneous reference to FIGS. 1 through 2-3.

From operation 208, a determination may be made whether to purge memory 120, such as one or more data entries in printer log 114. A purging operation may be based on an amount of memory 120 used for a printer log 114 and/or a period time or other time parameter for a periodic purging. These settings may be set at operation 221 with administrative privileges. If a purging operation is to be performed as determined at operation 219, then at operation 222 at least one operation image 111 and associated operation metadata 112, including user identity 113, may be purged or deleted from printer log 114 in memory 120. After purging at operation 222, a notification flow may resume or wait for another selection at operation 201. However, if no purge is to be performed as determined at operation 219, a notification flow may resume at operation 201.

Figures 2, 3, 4:
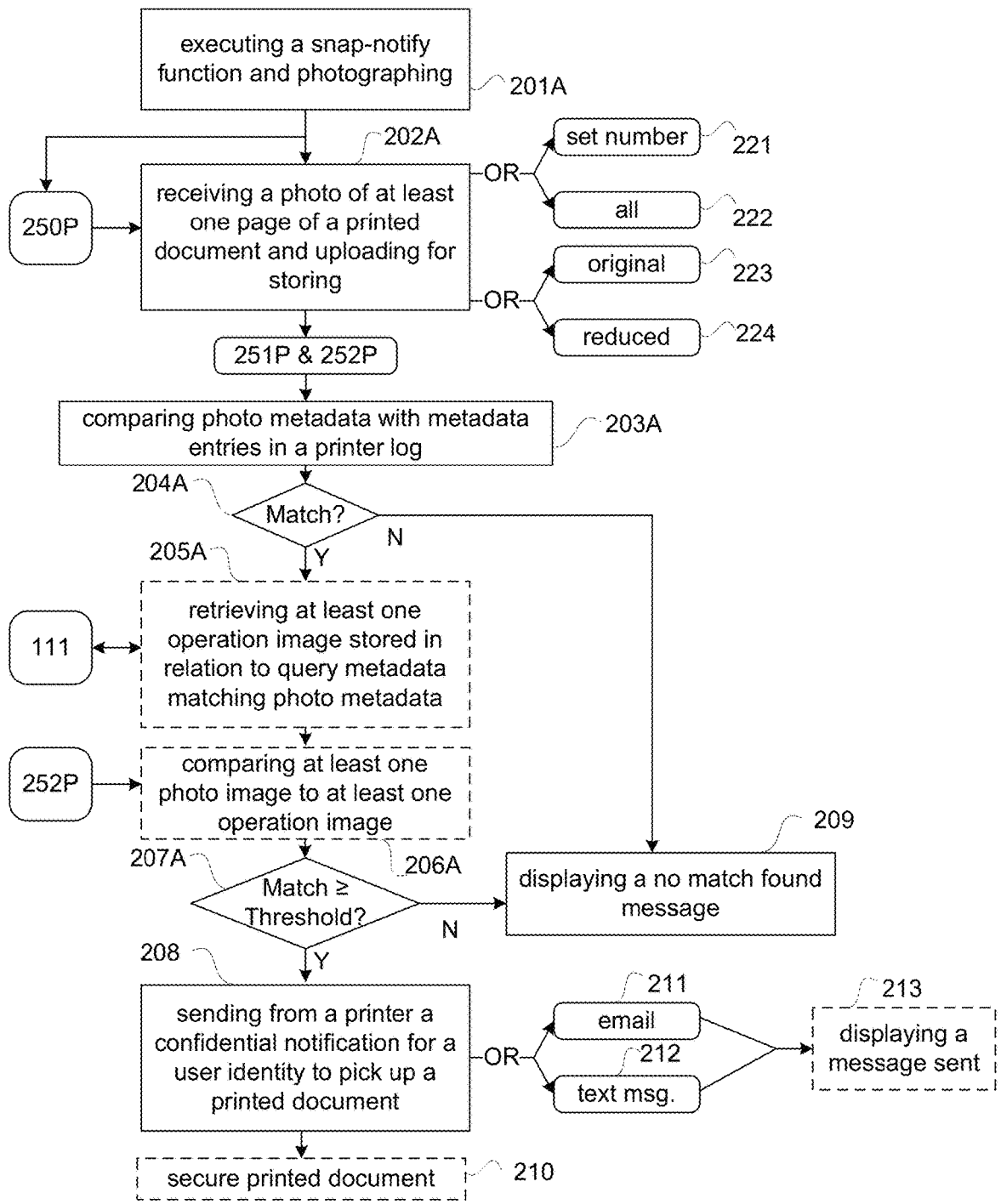
Figure 3:
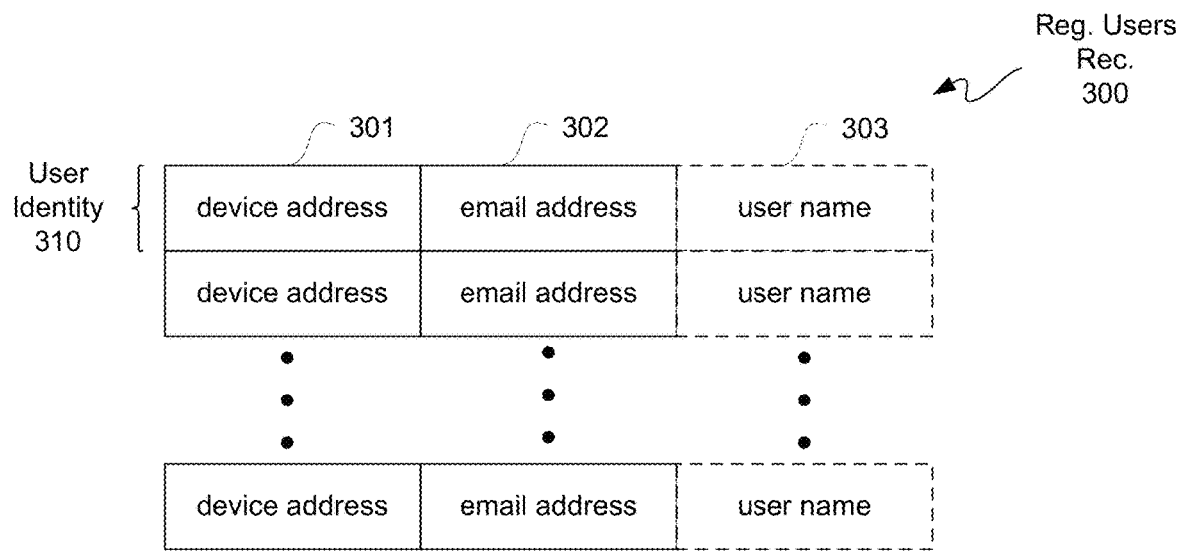
Figure 4:
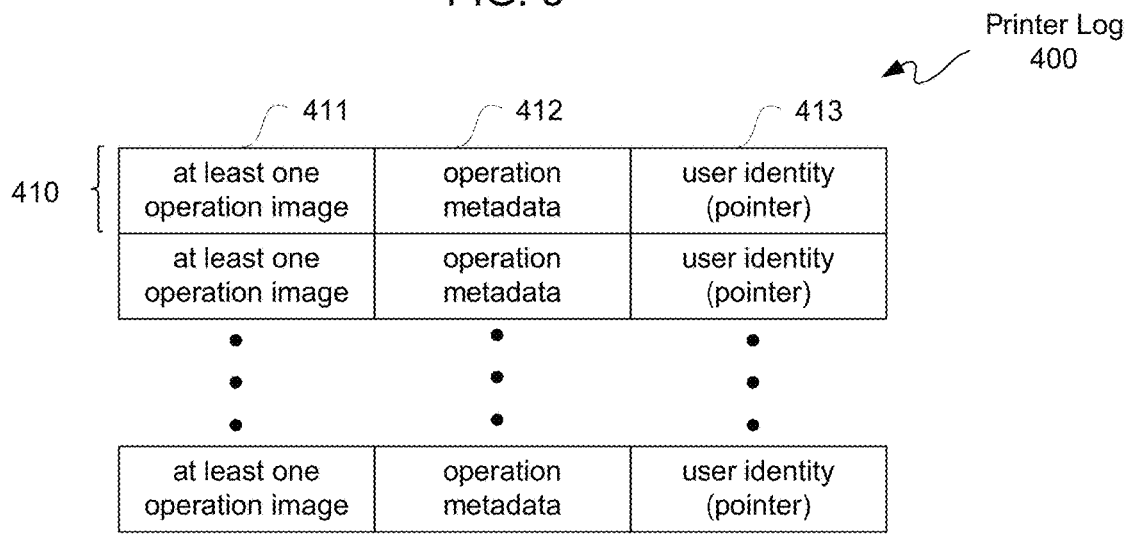

FIG. 2-4 is a flow diagram depicting an example of another backend portion 200A of a notification flow to pick-up a printed document. Backend portion 200A is described further with simultaneous reference to FIGS. 1 through 2-4.

Backend portion 200A is for post processing with respect to frontend portion 100, such as associated with acts by a second user ("User B") of such an MFP. Accordingly, portions 100 and 200A may be combined as described herein to notify a user.

In this example, such a printer or MFP does not have a scanner, or a working scanner. Along those lines, at operation 201A, a snap-notify function may be executed on a snap-notify application of a mobile device in communication with such an MFP or a cloud-based computing system. In another example, at operation 201A, a snap-notify function may be executed on a snap-notify application of such an MFP in communication with such a mobile device with a camera or a wireless camera and in communication with a cloud-based computing system. A network, wired or wireless, may be used for communication with such a mobile device as between such a printer and/or cloud-based computing system. Execution of such a snap-notify function may cause a camera of such a mobile device to be activated. A wireless network may be used for communication with such a wireless camera as between such a printer and/or cloud-based computing system.

Using such snap-notify application, User B may photograph one or more pages of a printed document using such camera to obtain at least one photograph 250P. At operation 202A, a photograph of at least one printed page of such printed document is received via such camera, and at least one photo image 252P and associated photo metadata 251P therefor of such at least one photograph 250P is uploaded and stored, such as in a cloud-based computing system or in an MFP.

Optionally, such a snap-notify application may be configured to not store, or only temporarily store, photos 250P taken with such camera under execution of such a snap-notify application. Along those lines, after uploading from a mobile device or wireless camera to a cloud-based computing system, such mobile device or wireless camera may be configured via such snap-notify application to delete such uploaded photo image(s) 252P and associated photo metadata 251P from its own memory. However, in this example, a photograph 250P of at least one printed page of a printed document via a camera may be stored as at least one photo image 252P along with associated photo metadata 251P in a mobile device.

For storing at least one photo image 252P of such a printed document, a set number of pages 221 may be set as a maximum number of pages or images for such at least one photo image 252P to store for a printed document. In another example, for storing at least one photo image 252P of such a printed document, all pages 222, namely no maximum number of pages or images, to store for a printed document may be set. Again, a User B may determine how many photos to take.

Furthermore, a User B need not scan or photograph starting from page 1 and progressing sequentially through a document. For example, a User B may start at any page and randomly select one or more other pages to photograph or scan. Page numbers on a printed document may be used to determine which pages to use for purposes of comparison; or a User B may input which pages were scanned or photographed.

For storing at least one photo image 252P of such a printed document, an original resolution 223 may be set for such at least one photo image 252P for such an MFP or in a cloud-based computing system to store for a printed document. In another example, for storing at least one photo image 252P of such a printed document, a reduced resolution 224, such as for reducing memory requirements and/or enhanced security, for such an MFP or a cloud-based computing system to store at least one photo image 252P for a printed document may be set. Settings 121 through 124 may correspond to settings 221 through 224 for purposes of subsequent comparison.

In this example, at least a 75% reduced resolution from an original printed sheet is used; however, in another example, a different reduction of resolution may be used. Again, for this example, for an original resolution of 600 dpi (dots per inch) horizontally and vertically in every square printed inch of sheet, a 75% reduction in resolution may be 150 dpi horizontally and vertically in every square printed inch scanned. Such a reduced resolution format may be preset for a photographing operation to obtain at least one photograph 250P responsive to execution of a snap-notify function at operation 201A, or such a reduced resolution format may be obtained by a conversion of at least one photograph 250P after a photographing operation 201A to provide at least one photo image 252P.

At operation 203A, photo metadata 251P is compared with data entries in a printer log 114 to obtain a match to stored operation metadata 112. At operation 204A, it is determined whether there is a match as between photo metadata 251P and operation metadata 112, such as stored in printer log 114 for example. If no match is found as determined at operation 204A, at operation 209 a no match found message may be displayed on a display of such an MFP. In this example, an exact match threshold is used. However, in another example a less than an exact match threshold may be used.

Along those lines, a photo image of a printed document may be compared with print metadata 251P stored on a printer for example. For purposes of clarity by way of non-limiting example, print metadata 251P may include information such as color or BW, page size (e.g., A4, letter, legal, etc.) and/or number of pages. To obtain information about page size from photo data, an image-to-image comparison may be performed using keypoint extracting, keypoint matching, scale-invariant feature transforming (e.g., SIFT) of keypoints, and/or other image-to-image feature extraction technology for purposes of image-to-image comparison.

For a match between photo metadata 251P and operation metadata 112, at operation 205A, such an at least one operation image 111 stored in relation to such operation metadata 112 matching such photo metadata 251P may be retrieved. At operation 206A, such at least one photo image 252P for such matching photo metadata 251P may be compared to such at least one operation image 111 retrieved.

If a match is determined to a threshold percentage at operation 207A, namely one or more photos match corresponding operation images to at least a threshold percentage, at operation 208 such an MFP or cloud-based computing system may send a confidential notification to an identified user to pick up such printed document. If no match is found to at least a threshold percentage at operation 207A, at operation 209 a no match found message may be displayed on a display of such an MFP or mobile device. A threshold percentage in this example is 80%; however, in another example, a lower or higher threshold percentage may be used.

A confidential notification sent at 208 may be by email 211 and/or text message 212. This confidential notification may be sent from an MFP or cloud-based computing system without revealing User A identity to User B. Again, user identity 113 may be found with a match at operation 204A, and this user identity, such as for a User A, need not be displayed on a display of an MFP or mobile device for sending a confidential notification. Optionally, at operation 208, an MFP or cloud-based computing system in response to sending a confidential notification may display on a display screen of such MFP or mobile device at operation 213 to indicate a message was sent to an owner of a printed document without revealing user identity 113 of such owner.

Optionally, at a location of an MFP, there may be a safe with an electronic pad ("electronic safe") for opening, closing, locking, and unlocking. An electronic safe may be in communication with an MFP or cloud-based computing system for setting a code for unlocking. A confidential notification sent at 208 may include a code for opening such an electronic safe. Accordingly, at operation 210, User B may put a printed document in an electronic safe and lock it via a pad.

FIG. 3 is a block diagram depicting an example of a registered users record or table ("table") 300. Such registered users record includes identity data, such as identity data 115 and may be for registered users of an MFP, as previously describe with reference to FIG. 1.

There may be rows of user identity records in table 300 for each registered user. For example, a user identity 310 in a row of table 300 may include a user device address field 301, an email address field 302, and optionally a user name field 303. Accordingly, there may be a user device address, an email address, and optionally a user name for each registered user for an MFP. A confidential notification for example may be an email sent to a registered user of such registered users for a user identity found from a match, as previously described.

Figure 5:
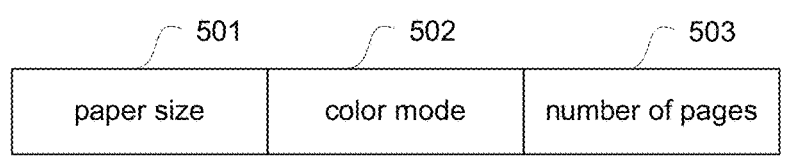
FIG. 5 is a block diagram depicting an example of an operation metadata record.

FIG. 4 is a block diagram depicting an example of a printer log 400. FIG. 5 is a block diagram depicting an example of an operation metadata record 500. FIGS. 4 and 5 are further described with simultaneous reference to FIGS. 1 through 5.

A printer log 114, such as may be in memory 120, may be for operations conducted using an MFP as previously described with reference to FIG. 1, and printer log 400 may be an example of a printer log 114.

Printer log 400 may be a table for relationally storing information; however, another type of relational data storage may be used. Each data entry row 410 may include at least one operation image 411 as previously described for a printed document. Each data entry row 410 may further include operation metadata 412 and user identity 413 each associated with such at least one operation image 411, such as previously described. Each data entry row 410 may include user identity or a pointer to user identity 413. For purposes of storage reduction and/or further security, a user identity pointer 413 may point to a user identity 310 in a table 300 of FIG. 3.

Operation metadata 412 may populate one or more fields of an operation metadata record 500. Such an operation metadata record 500 may include one or more of paper size field 501, a color mode field 502, and a number of pages field 503 of an associated printed document.

Figure 6:
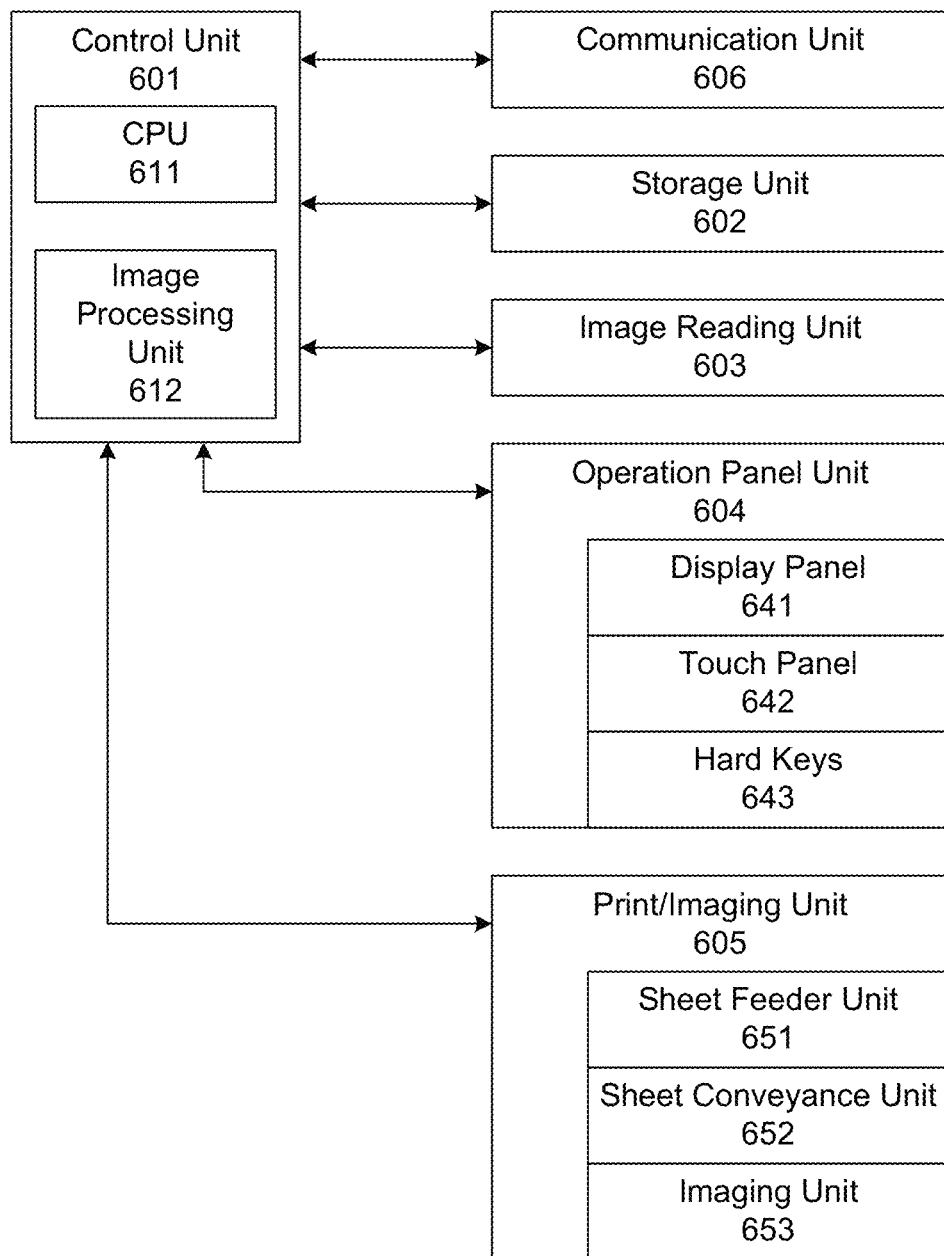
FIG. 6 is a block diagram depicting an example of a multifunction peripheral.

FIG. 6 is a block diagram depicting an example of a multifunction peripheral ("MFP") 600. MFP 600 is provided for purposes of clarity by way of non-limiting example.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611 and an image processing unit 612. Storage unit 602 may include ROM, RAM, and large capacity storage memory, such as for example an HDD or an SSD. Storage unit 602, which may include memory 120, may store various types of data and control programs.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
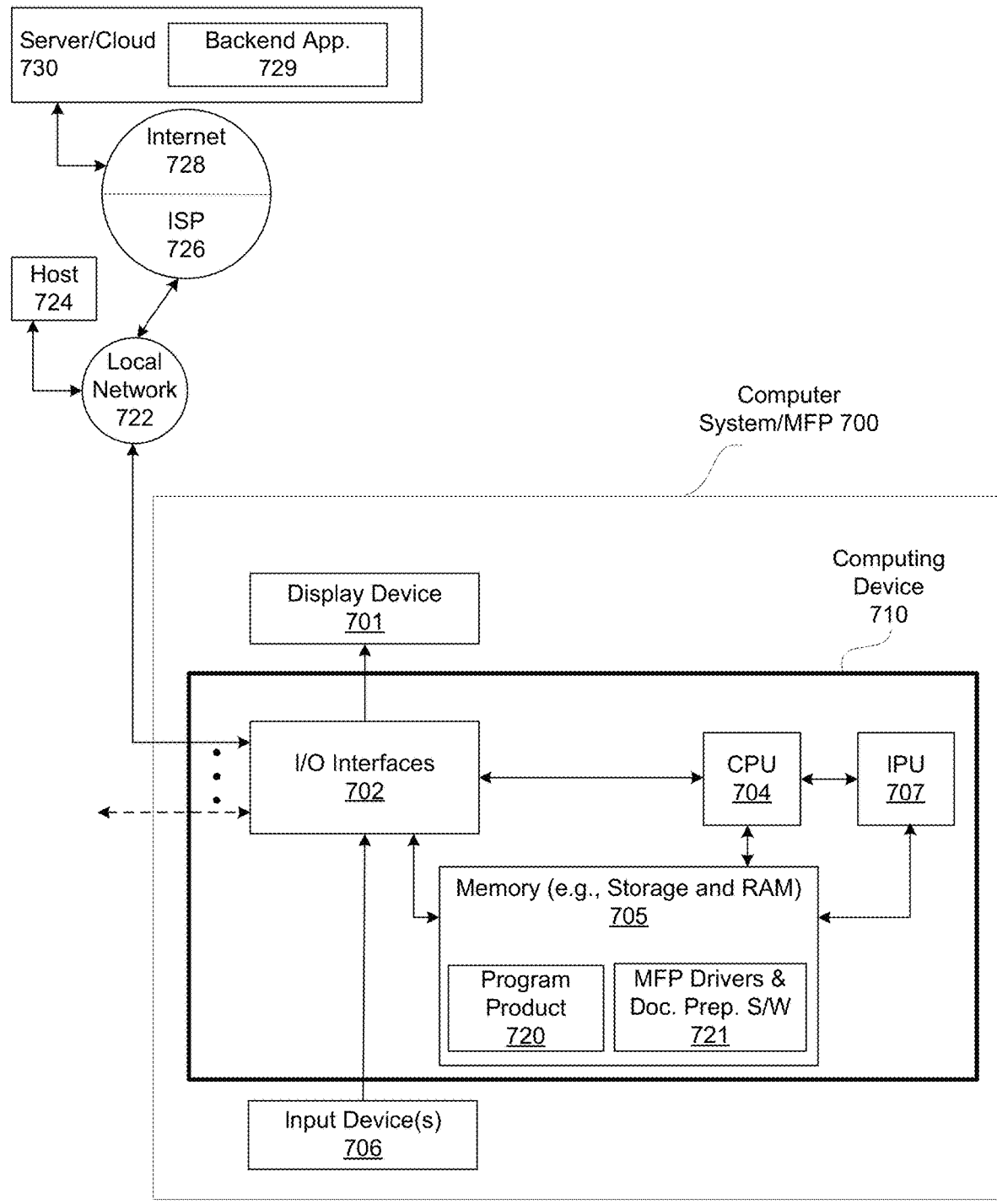
FIG. 7 is a block diagram depicting an example of a computer/multifunction peripheral system.

Because one or more examples include use of a programmed computer system, where such programmed computer system may include a communications server or a cloud-based computing system, FIG. 7 is a block diagram depicting an example of a computer/multifunction peripheral system 700 upon which one or more aspects described herein may be implemented. Along those lines, an MFP, such as MFP 600, in effect may be a computer system, where a panel thereof, is effectively a display device 701.

More generally, such a computer system/MFP 700 may include a programmed computing device 710 coupled to a display device 701, such as a Liquid Crystal Display ("LCD"), or a Light Emitting Diode ("LED") display, and to one or more input devices 706, such as a keyboard and a cursor pointing device. Display 701 may be a touch screen display. Computer system/MFP 700 by itself or networked with one or more other computer systems may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 710 may include a central processing unit ("CPU") 704, an image processing unit ("IPU") 707, one or more memories and/or storage devices ("memory") 705, and one or more input/output interfaces ("I/O interface") 702.

CPU 704 may be a type of microprocessor known in the art, such as those available from IBM, Intel, ARM, and Advanced Micro Devices for example. CPU 704 may include one or more processing cores. Support circuits (not shown) may include busses, cache, power supplies, clock circuits, data registers, and the like. IPU 707 may be a system-on-chip (SoC), application specific integrated circuit (ASIC), field programmable gate array (FPGA), or other integrated circuit chip.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through a SATA bus or other bus. Moreover, one or more SSDs may be used, such as for RAID or other multiple drive storage for example.

I/O interface 702 may include chip set chips, graphics processors, and/or daughter cards, among other known circuits. I/O interface 702 may include interface circuitry adapted to receive and transmit data, such as data files and the like.

Programmed computing device 710 may optionally include one or more peripheral cards (not shown). An example of a daughter or peripheral card may include a network interface card ("NIC"), a display interface card, and a Universal Serial Bus ("USB") interface card, among other known circuits.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware. Memory 705 may further be used to store MFP drivers and document preparation software 721.

Implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which may include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system/MFP 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system/MFP 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system/MFP 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system/MFP 700, are example forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system/MFP 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system/MFP 700 may obtain application code in the form of a carrier wave. Furthermore, server 730 may be a cloud-based computing system having a backend application 729 for execution of operations as previously described herein.

Figure 8:
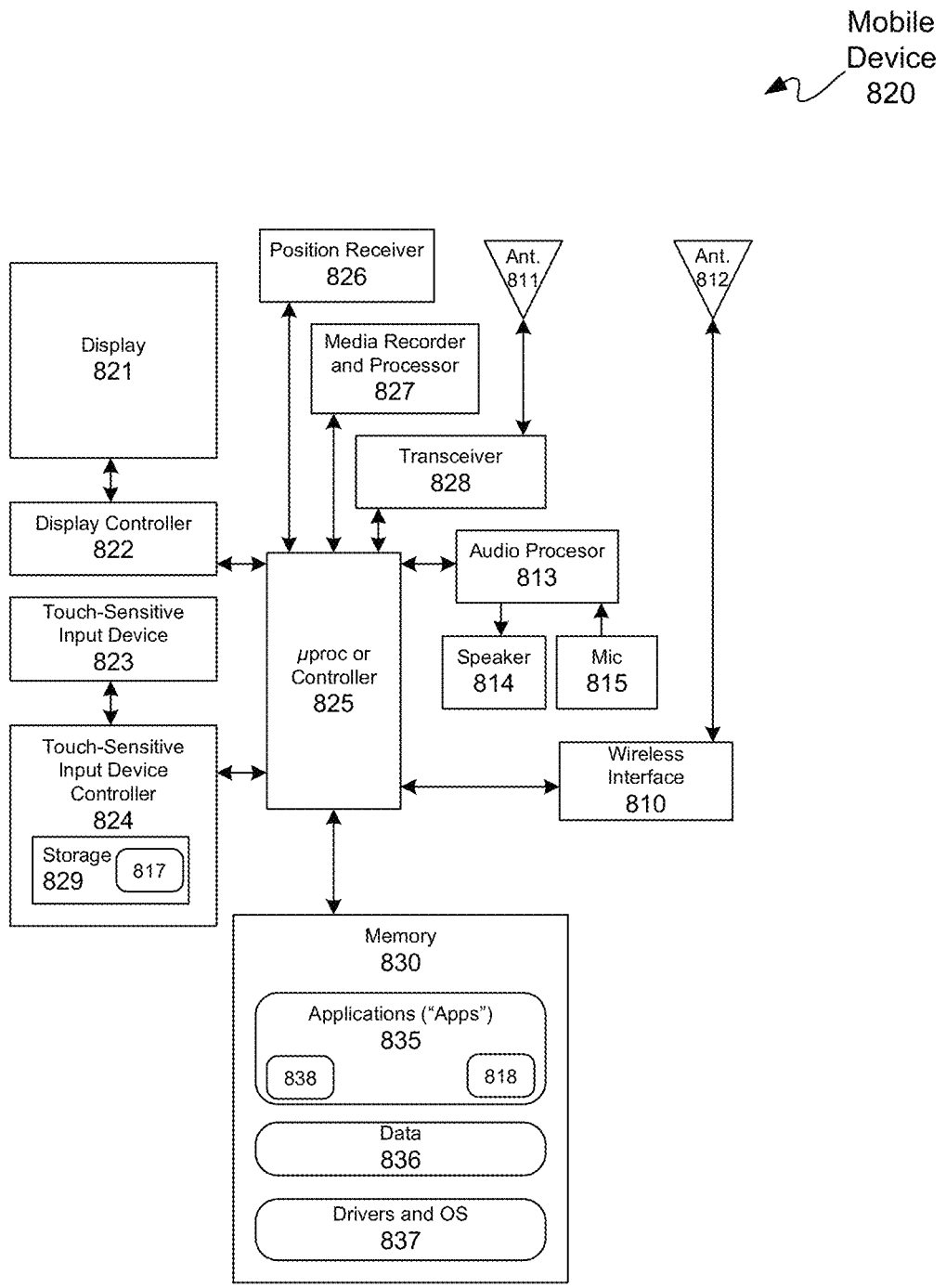
FIG. 8 is block diagram depicting an example of a portable communication device.

Because one or more examples involve a mobile device for a client device for inputting a customer request, such as via a text message or email for example, FIG. 8 is block diagram depicting an example of a portable communication device ("mobile device") 820. Mobile device 820 may include a wireless interface 810, an antenna 811, an antenna 812, an audio processor 813, a speaker 814, and a microphone ("mic") 815, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 820. Microprocessor or microcontroller 825 may include a commercially available or custom microprocessor or microcontroller.

Memory 830 may be interconnected for communication with microprocessor or microcontroller 825 for storing programs and data used by mobile device 820. Memory 830 generally represents an overall hierarchy of memory devices containing software and data used to implement functions of mobile device 820.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 820 may be configured to transmit, receive, and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data.

I/O device drivers may include software routines accessed through microprocessor or microcontroller 825 or by an OS stored in memory 830. Apps to communicate with devices, such as touch-sensitive input device 823 and other user interface objects adaptively displayed on a display 821, may use one or more of such drivers. For example, a driver may be used for communication from keys of a user interface displayed on display 821 associated with touch zones of touch sensitive input device 823. Moreover, drivers may be used for other actual or virtual input/output ports of mobile device 820.

Mobile device 820, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor programmed with a driver for operating touch-sensitive input device 823. For example, touch-sensitive input device may be a haptic input device, a pressure-sensitive input device, or some other touch-sensitive input device.

Along those lines, touching activity input via touch-sensitive input device 823 may be communicated to touch-sensitive input device controller 824. Touch-sensitive input device controller 824 may optionally include local storage 829 for storing locations or touch zones or other sensed information 817 associated with touching activity input. In another example, sensed information 817 may be stored in memory 830.

Touch-sensitive input device controller 824 may be programmed with a driver or application program interface ("API") for output of sensed information 817 to an app 818 of apps 835. In another example, app 818 may be incorporated into OS 837.

App 838 may be a snap-notify app of apps 835. Snap-notify app may be configured to execute operations as previously described herein.

Microprocessor or microcontroller 825 may be programmed to interface directly via touch-sensitive input device 823 or through touch-sensitive input device controller 824. Microprocessor or microcontroller 825 may be programmed or otherwise configured to interface with one or more other interface device(s) of mobile device 820. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 820 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 820 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones ("mic") 815, for projecting and receiving sound, including without limitation recording sound, via mobile device 820. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 820 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output corresponding to audio data may be transferred from mobile device 820 via an adapter to another mobile radio terminal, a computer, or another electronic device. In another example, wireless interface 810 may be for communication within a cellular network or another Wireless Wide-Area Network ("WWAN").

Figure 9:
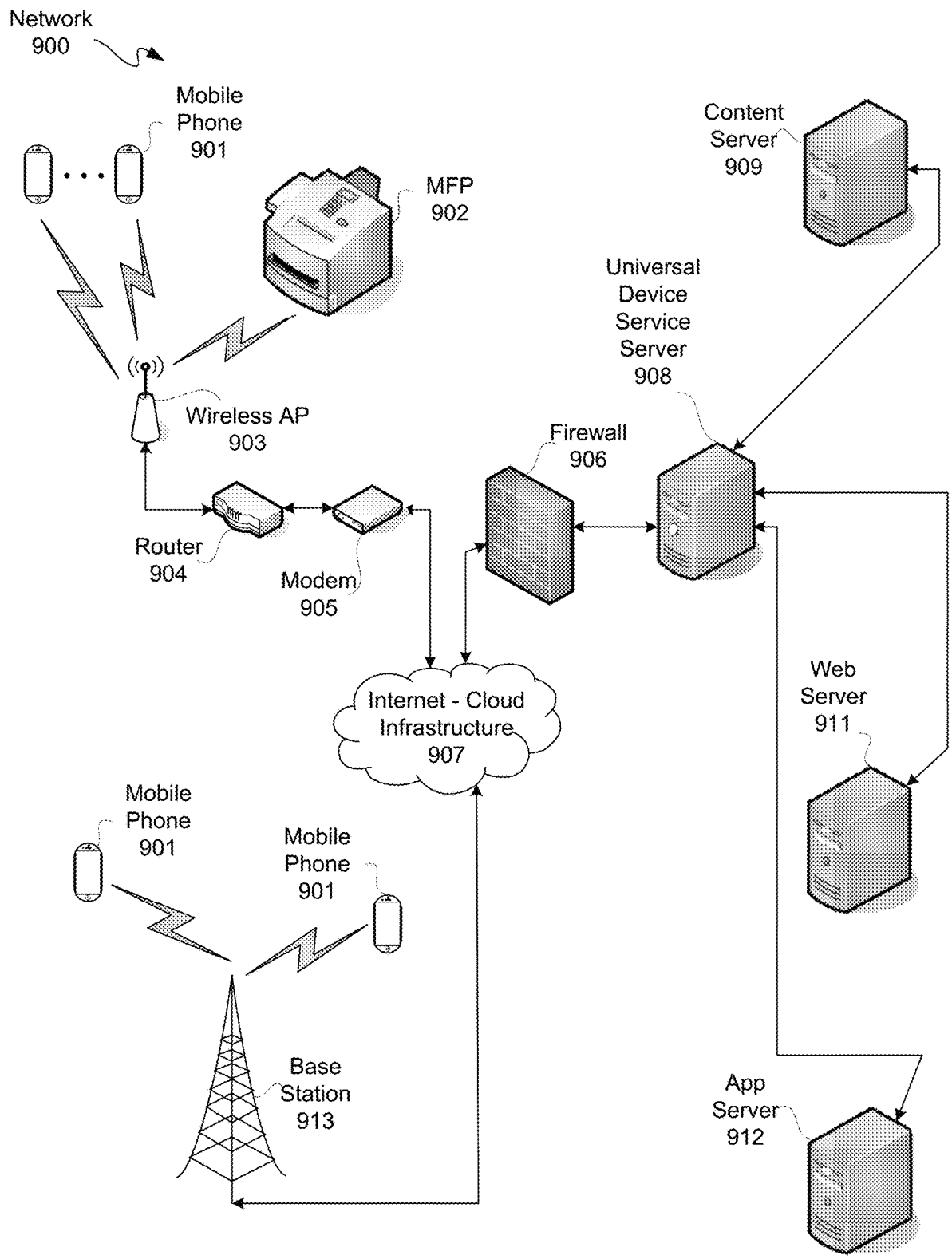
FIG. 9 is a pictorial diagram depicting an example of a network.

Because one or more examples involve a network or networks, FIG. 9 is a pictorial diagram depicting an example of a network 900. Network 900 may include one or more mobile phones 901 in wireless communication with wireless access point ("AP") 903 and one or more mobile phones 901 in communication with a base station 913.

An MFP 902 may be in wireless communication with wireless AP 903. Wireless AP 903 may be connected for communication with a router 904, which in turn may be connected to a modem 905. Modem 905 and base station 913 may be in communication with Internet-Cloud infrastructure 907.

A firewall 906 may be in communication with Internet-Cloud infrastructure 907. Firewall 906 may be in communication with a universal device service server 908. Universal device service server 908 may be in communication with a content server 909, a web server 911, and/or an app server 912.

Accordingly, known details regarding networks are not described in unnecessary detail for purposes of clarity and not limitation.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for notification to pick-up a printed document, comprising:
    for a printing operation of a printer, storing in a memory of the printer:
        at least one print image of the printed document;
        print metadata associated with the printing operation in a printer log; and
        a user identity associated with the printing operation;
    executing a snap-notify function of an application to cause a camera to be activated;
    receiving a photograph of at least one printed page of the printed document via the camera to store therefor at least one photo image and associated photo metadata; and sending from the printer a notification for the user identity to pick up the printed document.

2. The method according to claim 1, further comprising:
comparing the photo metadata with data entries in the printer log to obtain a match to the print metadata; and
retrieving the at least one photo image stored in relation to the photo metadata matching the print metadata.

3. The method according to claim 2, further comprising:
comparing the at least one photo image to the at least one print image; and
responsive to determining the at least one photo image matches the at least one print image to at least a threshold percentage, performing the sending from the printer the notification for the user identity to pick up the printed document, wherein the notification is a confidential notification.

4. The method according to claim 3, wherein:
for the storing of the at least one print image, storing up to a set number of pages of the printed document; and
for the receiving of the at least one photo image, storing up to the set number of pages of the printed document photographed.

5. The method according to claim 3, wherein:
for the storing of the at least one print image, storing all pages of the printed document for the comparing the at least one photo image to the at least one print image; and
for the receiving of the at least one photo image, storing all the pages of the printed document for the comparing the at least one photo image to the at least one print image.

6. The method according to claim 3, wherein the at least one print image and the at least one photo image are both in a same reduced resolution format.

7. The method according to claim 3, wherein:
the user identity is in the identity data;
the identity data includes a device address and an email address for each of the registered users; and
the confidential notification is an email sent to a registered user of the registered users for the user identity.

8. The method according to claim 3, wherein the print metadata includes one or more of paper size, color mode and number of pages of the printed document.

9. The method according to claim 3, wherein the comparing the at least one photo image to the at least one print image is performed on a pixel-by-pixel basis.

10. The method according to claim 3, wherein the comparing of the at least one photo image to the at least one print image is performed on a first pixel-by-pixel basis with pattern matching followed by a second pixel-by-pixel basis with edge detection responsive to the first pixel-by-pixel basis comparison not resulting in the match to at least the threshold percentage.

11. The method according to claim 3, further comprising periodically purging the memory of the printer to delete the at least one print image and the print metadata.

12. The method according to claim 11, wherein only administrative privileges are allowed to access and edit the identity data and to set a period for the periodic purging.

13. The method according to claim 3, wherein the application is on a mobile device in communication with the printer via a network to cause the camera of the mobile device to be activated.

14. The method according to claim 13, wherein responsive to the comparing of the photo metadata with the data entries to obtain the match to the print metadata not resulting in the match, displaying a no match found message on a display screen of the printer or the mobile device.

15. The method according to claim 13, wherein responsive to determining the at least one photo image does not match the at least one print image to at least the threshold percentage, displaying a no match found message on a display screen of the printer or the mobile device.

16. The method according to claim 3, wherein the application on the printer is in communication with a mobile device via a network to cause the camera of the mobile device to be activated.

17. The method according to claim 16, wherein responsive to the comparing of the photo metadata with the data entries to obtain the match to the print metadata not resulting in the match, displaying a no match found message on a display screen of the printer or the mobile device.

18. The method according to claim 16, wherein responsive to determining the at least one photo image does not match the at least one print image to at least the threshold percentage, displaying a no match found message on a display screen of the printer or the mobile device.

19. A printer for notification to pick-up a printed document, comprising:
memory of the printer configured to register identity data for registered users thereof;
the printer configured to store in the memory for a print operation associated with the printed document:
at least one print image of the printed document;
print metadata associated with the print operation in a printer log; and
a user identity associated with the print operation;
a snap-notify function of an application configured to cause a camera to be activated to ready the camera for a photograph of at least one printed page of the printed document to store therefor at least one photo image and associated photo metadata; and
send a notification to the user identity to pick up the printed document.

20. The printer according to claim 19, wherein the printer responsive to the application is configured to:
compare the photo metadata with data entries in the printer log to obtain a match to the print metadata;
retrieve the at least one photo image stored for a match between the photo metadata and the print metadata; and
compare the at least one photo image to the at least one print image for a match to send the notification.

* * * * *